July 17, 1934.     J. E. NEALE     1,967,129
WELDING
Filed July 22, 1930     2 Sheets-Sheet 1
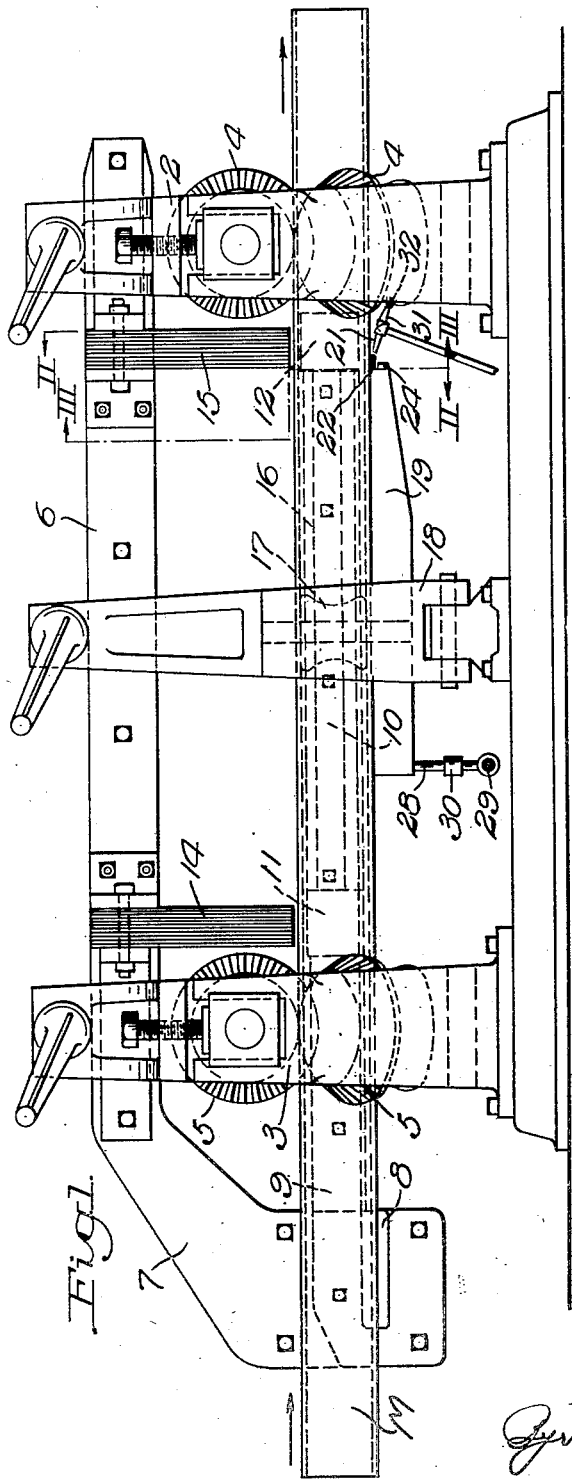
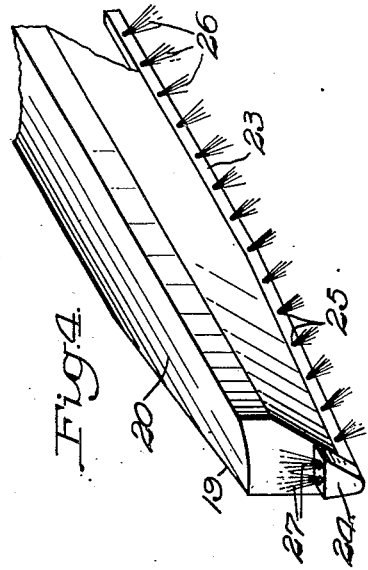
INVENTOR
John C. Neale

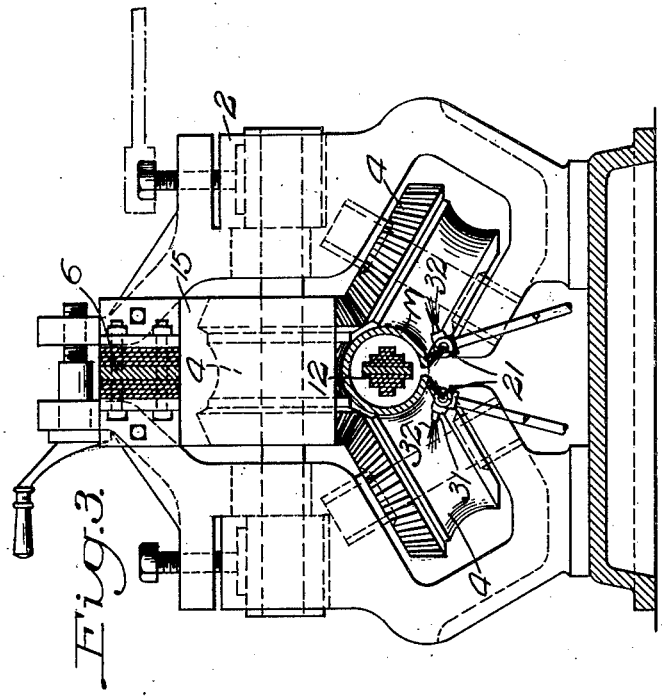

Patented July 17, 1934

1,967,129

UNITED STATES PATENT OFFICE 1,967,129

WELDING

John E. Neale, Youngstown, Ohio, assignor to The Youngstown Sheet & Tube Company, Youngstown, Ohio, a corporation of Ohio Application July 22, 1930, Serial No. 469,876

6 Claims. (Cl. 219—6)

The present invention relates broadly to the art of welding, and more particularly to the art as applicable to the welding of substantially tubular pre-formed material. While many features of the present invention are applicable to the art of welding regardless of whether the heating is produced electrically as by flash heating, resistance heating, or arc heating; or by gas heating such as obtained by acetylene torches, and oxygen or special combustion supporting atmospheres or the like, it is herein illustrated and described more particularly in connection with an electric welding operation of the so-called flash type. It will be understood, however, that the utility thereof is not limited to any particular means by which the heating temperatures for welding purposes are obtained.

In the art of welding tubular material it is considered necessary by those skilled in the art to subject the previously heated material to pressure conditions sufficient to bring the heated edges thereof into welding engagement. Whether such welding pressure is obtained by means of a roll pass, a succession of roll passes, by a die or dies, or by use of the so-called drawing bell, the pressure applied to the material tends to force into all portions of its surface any projecting particles.

It is well known that the heating operation which must necessarily be such as to raise at least the edge portions of the material to a substantially molten condition, produces a vapor charged with a considerable quantity of molten material. Due to the tremendous volume of such vapors as compared to the original space occupied by the metal itself, a vapor pressure is developed such as to tend to distribute molten particles, usually in the form of small pellets, around a substantial portion of the periphery of the material. These particles or pellets, upon coming into contact with the main body of the material, which is usually at approximately normal room temperature, or slightly above such temperature, immediately solidify on the material. Subsequently, during the application of the welding pressure as before described, such particles are forced into the surface of the material thereby producing a series of imperfections such as indentations, or "pock" marks as they are designated in the mill. While the production of such marks on the main portion of the material does not interfere with the intended use thereof, material characterized by such marks is considered to be of lower quality and therefore commands a correspondingly lower price. The inclusion of such particles within the seam, however, is decidedly objectionable inasmuch as they may interfere with the welding operation to such an extent as to produce a partially imperfect seam in the finished article.

It is one of the objects of the present invention to provide a welding system characterized by the provision of means effective for confining the vapors and molten particles and producing a directional disposition thereof. The confined zone produced in accordance with the present invention preferably extends lengthwise of the proposed line of weld whereby the disposition of molten particles on the main periphery of the article being welded is prevented. Such a confined zone adjacent the line of weld further makes it possible to effectively dispose of any particles which might subsequently tend to become incorporated in the same, and also permits such working of the heated edge portions as to minimize the formation of any appreciable burr on the finished product.

In addition to permitting a directional disposition of the vapors and molten particles, the present invention is effective to an appreciable extent for concentrating the heating operation to the edge portions themselves. This not only results in the conservation of heat by localizing it to the portions which are to be welded, but results in a superior product for two principal reasons. In the first place by localizing the heating operation to a comparatively narrow zone, the tendency of the material to camber upon cooling is minimized inasmuch as the heated zone bears such a small relation to the complete area of the article that its camber-producing tendency is effectively offset. In the second place it provides an extremely small zone a part of which is raised to a welding temperature, and the remainder of which is characterized by substantially refined grain structure. The subsequent application of welding pressure is sufficient to substantially bring together the zones of refined grain structure, whereby the grain structure at the weld is in many cases even superior to the grain structure of the parent material.

The foregoing and other objects of the invention will appear more fully as the invention becomes better understood by reference to the following specification and accompanying drawings forming a part thereof. In the drawings:

Figure 1 is a longitudinal sectional view partly in elevation, and largely diagrammatic, of one form of apparatus constructed in accordance with the present invention;

Figure 2 is a transverse sectional view on the line II—II of Figure 1 looking in the direction of the arrows;

Figure 3 is a transverse sectional view on the line III—III of Figure 1 looking in the direction of the arrows;

Figure 4 is a perspective view of one of the combined confining, cooling and guiding means.

For purposes of convenience in describing the present invention I have illustrated the same as applied to a welding apparatus which is generally of the type disclosed and claimed in the co-pending application of James L. Adams, Jr., Serial No. 297,962, filed August 7, 1928. Such a welding apparatus comprises generally a stand 2 hereinafter referred to as the welding stand, and a stand 3 hereinafter referred to as the crushing or sizing stand. These stands respectively are provided with rolls 4 and 5 hereinafter designated as welding rolls and crushing or sizing rolls. One or more rolls of either or both of the stands may be driven in any desired manner (not shown) and may likewise be mounted for adjustment to vary the diameter of the roll pass provided.

Extending between the stands is a yoke 6, preferably of laminated construction having an extension 7 carrying a center or spreader plate 8. Secured to the plate 8 is a torpedo 9 constituting at its left hand end as viewed in Figure 1, receiving and guiding means for tubular material M, and at its right hand end as viewed in this figure an inner coil and core assembly 10. The core is shown as comprising a laminated structure terminating in inner pole pieces 11 and 12 cooperating respectively with outer pole pieces 14 and 15 in magnetic relationship to the yoke 6.

Surrounding the core intermediate the pole pieces 11 and 12 is a suitable coil structure 16 adapted to be supplied with periodically varying current from a suitable source, and constituting the primary of a transformer, the secondary of which comprises the material M.

By reason of the construction just described, it will be apparent to those skilled in the art that, when current is supplied to the coil structure 16, and the secondary is in position therearound, a current flow will be induced in the secondary circumferentially thereof. Due to the fact that the secondary constitutes a single turn open at its edges only, it will be apparent that the resistance afforded is greatest at the space defined by the adjacent edges, which space constitutes the proposed line of welding or seam line. Due to the greater resistance to current flow at the seam line, the maximum heating occurs in this region. By suitably controlling the current input to the coil structure 16, the amount of the heating is sufficient to raise the edges to, or substantially to, a welding temperature during the travel of the material through the apparatus.

In accordance with the present invention the crushing or sizing rolls may be either so adjusted as to bring the edges of the material into contact during its passage therethrough or so adjusted as to permit the edges to remain in slightly spaced relationship. The inherent springlike tendency of the material is such as to cause the edges upon leaving the crushing stand to spring apart, the extent of opening movement being controlled by flash regulating rollers 17 in a flash regulating roll stand 18. Where the adjustment of the parts is such that an initial contact of the edges occurs while passing through the crushing stand the circuit will be initially closed at this point, thereby establishing a current flow across the seam which, during the travel of the material and the subsequent separation of the edges to the extent permitted by the flash regulating rollers, will continue in the form of a flash. The length of the flash itself, which is dependent upon the separation of the edges and the length of the flash zone, may be determined by the adjustment of the flash regulation rollers, the flash zone continuing in point of space as the material travels onwardly through the apparatus.

Where the adjustment of the parts is such that the edges of the material are not brought into contact during passage through the crushing roll stand, the flash is initiated at a point determined either by the adjustment of flash regulating rollers or by the welding rolls themselves, the adjustment being such that the edges are brought into contact, in such case, at a point between the stands 2 and 3. From such point of initial contact, which creates the flash, the flash travels rearwardly in opposition to the direction of travel of the material and is maintained in point of space as the material travels forwardly. Thus with either type of operation a flash zone is provided in which the edges of the material are brought to, or substantially to, a welding temperature.

Continued travel of the material brings the heated edges, at the temperature to which they have been raised in the flash zone, into contact, thereby establishing a resistance zone in which further heating by the resistance method takes place. Thereafter the heated edges are brought into welding engagement by the application of welding pressure exerted by the welding rolls 4 carried by the welding stand.

Extending axially of the material and in a direction substantially radially thereof is a pair of confining guides 19. These two guides, except for being right and left, are preferably of generally similar construction and are so mounted as to bring the concave edges 20 thereof into guiding and supporting relationship with the edge portions of the material M on opposite sides of the proposed line of weld. In this position they define a zone Z in which the vapors produced by the flash heating operation and the molten material thrown off with the vapors are confined so that the subsequent deposition of particles of molten material on the main portion of the periphery of the material is prevented.

In accordance with the present invention, however, it is desired not only to provide a defined zone of the character referred to but to provide means for the directional removal from the material and from the zone Z of such vapor and molten particles. This may be accomplished as herein illustrated by the utilization of air nozzles 21 effective for discharging air jets 22 upwardly toward the material in a direction generally opposed to its direction of feeding movement and preferably at such an angle as to intersect the proposed line of weld from opposite sides thereof. By the use of air under sufficient pressure, not only is it possible to completely remove the vapors and molten particles away from the material substantially as rapidly as they are produced, but it is also possible to obtain such a scouring action on the outer edge portions of the material as to remove material therefrom to an extent determined by the amount of pressure, and in such a manner that the tendency to produce a projecting burr or bead along the line of weld is correspondingly reduced. It will be apparent to those skilled in the art that the air also exerts a cooling action on the molten particles, thereby solidifying them to such an extent as to prevent their adherence either to the surface of the material upon coming into contact therewith, or from adhering to the surface of the welding rolls 4.

Inasmuch as the guides 19 are directly subjected to the intense heat set up in the flash zone, it is desirable to provide suitable cooling means therefor. This cooling means I have herein illustrated as comprising a duct 23 formed within and extending lengthwise of each of the guides on the side adjacent the zone Z, the end portions of the ducts being directed upwardly as indicated at 24. Such ducts at suitable points throughout the length may be provided with separated openings 25 adapted to produce a series of water jets 26 extending upwardly and outwardly from the respective guides across the zone Z. The upturned ends 24 in turn tend to produce jets 27 effective for cooling the ends of the respective guides whereby the desired length of life of the guides is obtained.

The water jets in addition to affording the desired cooling of the guides themselves further cooperate with the air jets in effecting the solidifying of metal particles discharged outwardly by the flash heating operation.

It will be apparent that the water jets instead of being positioned in the manner illustrated in the drawings may be so positioned on the guides that the water discharged therefrom will be effective for cooling the guides from which the water is discharged. This can be accomplished, for example, by moving the water conduits upwardly with respect to the lower portions of the guides and thus closer to the material, and permitting some portion of the water to be discharged downwardly over the guide surfaces.

For supplying cooling water to the ducts 23, each of the ducts is formed with a suitable connection 28 in turn connected to a source of water supply 29 through insulated couplings 30 provided to prevent short circuiting of the seam in the material.

I also preferably provide opposed nozzles 31 directed downwardly in such manner as to provide water jets 32 effective against the surface of one of the welding rolls to thereby prevent the adherence to the roll surface of molten metal particles. The water discharged against the welding roll surfaces is also effective for actually washing off the surfaces and maintaining them clean, so that the appearance of the finished article is not impaired as would be the case if foreign matter were permitted to accumulate on the roll surfaces and be rolled into the surface of the material being welded. I have also found that the cooling effect of the water so discharged produces such a contraction of the heated metal particles as to cause them to actually crack away from the rolls even in case such particles have previously been ejected onto the roll surfaces.

By reason of the cooling means just described, the guides 19 also tend to restrict the zone of heating of the edges and limit this zone to a region closely adjacent the edges. Such a condition of heating is highly desirable inasmuch as it not only conserves the energy input required to bring the edges themselves to a welding temperature by tending to confine the heat, but also for the reason that, by limiting the heating effect to a comparatively narrow zone, the total area of heated metal constitutes such a small fraction of the total cross sectional area of the material as to be ineffective for imparting any tendency toward spiraling of the seam itself.

The guides also possess the advantage of tending to maintain the edge portions of the material in directly opposed relationship within the flash zone, whereby the edges are maintained in such alignment that subsequent tendency toward riding up or overlapping is minimized.

The advantages of the present invention arise not only from the provision of means adjacent the edges of substantially tubular material for mechanically supporting and guiding the same, but from the provision of means effective for restricting the heated area and for confining the vapor and molten metal particles.

Still further advantages of the invention arise from the provision of an apparatus, and the practice of a welding method, effective for producing not only a solidification of the metal particles but preferably also a directional removal thereof coincident with a scouring or wiping action against and across the edge portions of the material adjacent the proposed line of weld.

Still further advantages of the invention arise from the provision of a method and apparatus applicable to the welding of substantially tubular material and effective for preventing the deposition on the surface thereof of molten particles such as would tend to produce pock marks or other imperfections on the surface during the subsequent application of the necessary welding pressure thereto.

While I have herein illustrated and described a preferred embodiment of the present invention, it will be understood that the structure herein described, as well as the method described, may both be changed or modified without departing either from the spirit of the present invention or the scope of my broader claims.

I claim:

1. In a continuous welder, means for progressively advancing plate edges in opposed, spaced relation, means for causing heating current to flow across the seam cleft between said plate edges in a predetermined zone, the zone of current flow moving relative to the edges in a direction opposite that of the movement of said edges, a roll stand for progessively applying welding pressure to the heated edges, and means for directing a fluid jet on to said edges prior to the entrance thereof into said roll stand, to remove molten metal particles therefrom.

2. In a continuous welder, means for progressively advancing plate edges in opposed, spaced relation, means for causing heating current to flow across the seam cleft between said plate edges in a predetermined zone, the zone of current flow moving relative to the edges in a direction opposite that of the movement of said edges, a roll stand for progressively applying welding pressure to the heated edges, and means for directing a fluid jet on to the rolls of said stand to remove metal particles tending to adhere thereto.

3. In a continuous welder, means for progressively advancing plate edges in opposed, spaced relation, means for causing heating current to flow across the seam cleft between said plate edges in a predetermined zone, the zone of current flow moving relative to the edges in a direction opposite that of the movement of said edges, means for forcing the heated edges together to effect a weld therebetween, and means for directing a fluid jet on to said edges prior to their union by said pressure-applying means, to remove molten metal particles therefrom.

4. In a continuous welder, means for progressively advancing plate edges in opposed, spaced relation, means for causing heating current to flow across the seam cleft between said plate edges in a predetermined zone, the zone of current flow moving relative to the edges in a direction opposite that of the movement of said edges, spaced walls extending along said zone substantially perpendicular to said edges for confining material ejected from the seam cleft, means for progressively applying pressure to the heated edges to effect a weld therebetween, and means for directing a fluid jet on to said edges between said walls prior to the union of the edges to remove molten metal particles therefrom.

5. In a continuous welder, means for progressively advancing plate edges in opposed, spaced relation, means for causing heating current to flow across the seam cleft between said plate edges in a predetermined zone, the zone of current flow moving relative to the edges in a direction opposite that of the movement of said edges, a roll stand for progressively applying welding pressure to the heated edges, and means for directing a fluid jet on to said edges between said walls prior to the entrance of the edges into said roll stand, to remove molten metal particles therefrom.

6. In a method of continuously welding the edges of a formed tube blank into a seam, the steps including progressively inducing a cross seam heating current circumferentially of the blank from the interior thereof, to exert a repulsion effect on particles shed by said edges when heated, confining such ejected particles to a space adjacent said edges and extending along the zone of current induction, and directing a fluid jet along said edges in said space, to remove the particles therefrom.

JOHN E. NEALE.